United States Patent
Han et al.

(10) Patent No.: US 12,271,173 B2
(45) Date of Patent: Apr. 8, 2025

(54) EXTERNAL, NUMERICALLY CONTROLLED, RAPID RECONFIGURABLE SURFACE MOLD AND FORMING METHOD THEREOF

(71) Applicant: JILIN UNIVERSITY, Changchun (CN)

(72) Inventors: Qigang Han, Changchun (CN); Yuanhao Wang, Changchun (CN); Zhiwu Han, Changchun (CN); Bo Li, Changchun (CN); Ziqin Wang, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 467 days.

(21) Appl. No.: 17/878,276

(22) Filed: Aug. 1, 2022

(65) Prior Publication Data

US 2023/0161315 A1 May 25, 2023

(30) Foreign Application Priority Data

Nov. 25, 2021 (CN) .......................... 202111414720.9

(51) Int. Cl.
*G05B 19/18* (2006.01)
*B21D 22/02* (2006.01)
(Continued)

(52) U.S. Cl.
CPC ........... *G05B 19/182* (2013.01); *B21D 37/10* (2013.01); *G05B 2219/37365* (2013.01); *G05B 2219/45204* (2013.01)

(58) Field of Classification Search
CPC ................................ B21D 37/10; B21D 37/04
(Continued)

(56) References Cited

U.S. PATENT DOCUMENTS

| | | | | | |
|---|---|---|---|---|---|
| 6,067,828 | A | * | 5/2000 | Bucher | ................ H01R 43/048 72/21.4 |
| 6,089,061 | A | * | 7/2000 | Haas | ...................... B21D 37/16 72/413 |
| 2022/0062968 | A1 | * | 3/2022 | Janiszewski | ......... B21D 43/003 |

FOREIGN PATENT DOCUMENTS

| | | |
|---|---|---|
| CN | 2548792 Y | 5/2003 |
| CN | 104669594 A | 6/2015 |

(Continued)

OTHER PUBLICATIONS

English translate (CN108817217A), retrieved date Dec. 13, 2024.*
English translate (KR20180061730A), retrieved date Dec. 13, 2024.*

*Primary Examiner* — Mohammed S. Alawadi
(74) *Attorney, Agent, or Firm* — MUNCY, GEISSLER, OLDS & LOWE, P.C.

(57) ABSTRACT

Disclosed are an external, numerically controlled, rapid reconfigurable surface mold and forming method thereof In this mold, an external shape-adjusting component is composed of a height-regulating rod, a motor, and a sliding guide rail module. The height-regulating rod is connected to the sliding guide rail module, and the motor is coaxially connected to the height-regulating rod. In addition, the molding module consists of a plurality of basic body units with the same structure, the lower end of the basic body unit is installed in the mold box, the upper end of the basic body unit is matched with the lower end of the height-regulating rod, and the height of the basic body unit is adjustable. Subsequently, in the forming method, driven by the motor and under the action of the force of the lower end of the height-regulating rod, the height-regulating rod moves above the basic body units.

10 Claims, 4 Drawing Sheets

(51) Int. Cl.
*B21D 22/06* (2006.01)
*B21D 31/00* (2006.01)
*B21D 37/02* (2006.01)
*B21D 37/10* (2006.01)
*B21D 37/16* (2006.01)

(58) Field of Classification Search
USPC .......................................................... 72/413
See application file for complete search history.

(56) References Cited

FOREIGN PATENT DOCUMENTS

| | | | |
|---|---|---|---|
| CN | 108817217 A | * | 11/2018 |
| CN | 110877074 A | | 3/2020 |
| KR | 20180061730 A | * | 6/2018 |

* cited by examiner

EXTERNAL, NUMERICALLY CONTROLLED, RAPID RECONFIGURABLE SURFACE MOLD AND FORMING METHOD THEREOF

TECHNICAL FIELD

The invention belongs to the technical field of flexible forming and manufacturing. More specifically, it relates to an external, numerically controlled, rapid reconfigurable surface mold and its forming method.

BACKGROUND

Flexible multi-point forming is a method for sheet metal rapid forming by discretizing the whole mold and controlling the Z-direction coordinates of the basic body units (or punches) which is distributed regularly.

After years of development, flexible multi-point forming technology is combined with digital manufacturing technology. With the use of computer control scattered regular arrangement of the basic body, the upper and lower forming surface can be well formed. Through the real-time control of the movement of the basic units, the forming surface can freely constructed. Eventually, three-dimensional surface forming of plates can be made.

In the existing technology, open technical schemes combined with the characteristics of sheet metal forming For example, "Sheet metal multi-point forming device (ZL 02273508.9)", "Composite surface hot pressing method based on multi-point reconfigurable mold (ZL 201510102729.4)", "a portable single-mold flexible forming device (ZL)201911263521.5)", etc. Those open technical solutions have realized flexible processing from metal sheets to composite sheets, and the forming method has also been greatly improved.

However, due to the above-mentioned existing technology, the forming mold of multi-point forming equipment adopts a built-in motor, and there are the following technical problems in the process of driving the basic body shape adjustment:

1. The built-in motor occupies the movement space of the basic body unit and indirectly occupies the forming space of the forming equipment, so that the operation space of the basic body unit is small, and the installation and maintenance are often inconvenient.

2. In the process of processing composite materials by forming equipment with a built-in motor, heating is needed in the process of composite material forming, and long-term heating will cause the motor to lose magnetism and damage, affecting the forming accuracy, and even affecting the normal use of equipment.

3. In order to avoid the technical defects caused by the built-in motor mentioned above, the present invention replaces the built-in motor with a built-in fixed module. However, the multi-point mold with a built-in fixed module needs to be re-made to match the built-in module when processing different materials or shapes of the sheet, which results in higher processing costs.

SUMMARY OF THE INVENTION

Aiming at getting rid of the defects in traditional composite materials, the present invention provides an external, numerically controlled, rapid reconfigurable surface mold and its forming method thereof, which can increase the movement space range of the basic body unit through external drive adjustment, lower equipment maintenance cost, better equipment stability, and higher forming accuracy.

With regard to the accompanying drawings in the description, the technical solutions of the present invention are as follows:

The external, numerically controlled, rapid reconfigurable surface mold and its forming method thereof, comprising: a forming module, a mold box, and a shape-adjusting component. The shape-adjusting component is an external adjusting component which is installed above the corresponding forming module, and consists of a height-regulating rod, a motor, and a sliding guide rail module, the height-regulating rod slides connected to the sliding guide rail module, an output end of the motor is coaxially connected with an upper end of the height-regulating rod;

The forming module is composed of a plurality of basic body units with a same structure, a lower end of the basic body unit is installed in the mold box, an upper end of the basic body unit is matched with a lower end of the height-regulating rod, and a height between the upper end of the basic body unit and the lower end of the basic body unit is adjustable;

Driven by the motor, the height-regulating rod moves to above a specified basic body unit, the lower end of the height-regulating rod and the upper end of the basic body unit is matched and connected, under an action of a force of the lower end of the height-regulating rod, the height between the upper end of the basic body unit and the lower end of the basic body unit is adjusted.

Furthermore, the basic body unit consists of a punch, a height-regulating unit in Z-direction, and a fixed screw.

The punch is arranged on a top of the height-regulating unit in Z-direction, and the height-regulating unit in Z-direction is coaxially threaded with the fixed screw.

Furthermore, the punch is a fixed punch or a swing punch;

The fixed screw is a solid or a hollow structure.

Moreover, the fixed screw is a hollow structure, and a heating rod is arranged inside.

In addition, the height-regulating rod is composed of an upper height-regulating rod, an elastic connecting unit, and a lower height-regulating rod.

An upper end of the upper height-regulating rod is coaxially rotatably connected with the motor, and the lower height-regulating rod is coaxially rotatably connected with a lower end of the upper height-regulating rod, and the lower height-regulating rod is axially slidably connected with the upper height-regulating rod;

The elastic connecting unit is arranged axially between the upper height-regulating rod and the lower height-regulating rod;

The lower end of the lower height-regulating rod is provided with a connecting cover, and the connecting cover is arranged on an outside of the punch and is matched and connected with the top of the height-regulating unit in Z-direction to realize synchronous rotation.

Furthermore, the connecting cover at the lower end of the lower height-regulating rod is matched with the top of the height-regulating unit in Z-direction by a rectangular groove.

Furthermore, the elastic connecting unit is a spring or a rubber.

Furthermore, the mold box is composed of a sealing plate, a bottom plate, and a base;

The sealing plate is fixed around a top of the bottom plate, and the base is fixed at a bottom of the bottom plate;

The sliding guide rail module is fixedly installed on the sealing plate;

The lower end of the basic body unit is fixed to the bottom plate.

The present invention also discloses a method for forming an externally modulated numerically controlled fast reconfigurable surface mold. It is formed as follows:

S1: Assembling the forming module in the mold box to ensure that all the basic body units are in the initial state;

S2: Installing the external shape-adjusting component above the mold box, and controlling the height-regulating rod to move along the sliding guide rail module to an initial coordinate position of a shape surface to be adjusted in a horizontal direction, and the height-regulating rod is connected with the upper end of the corresponding basic body unit.

S3: Starting the motor to drive the height-regulating rod to move. After controlling and adjusting the height of the upper end of the basic body unit relative to the lower end of the basic body unit, turning off the motor and completing a shape-adjusting work of the corresponding basic body unit under the initial coordinates;

S4: Controlling the height-regulating rod to move along the sliding guide rail module to a next coordinate of the shape surface to be adjusted in the horizontal direction. Repeating the above step S3 to complete the shape-adjusting work of the corresponding basic body unit in the corresponding coordinates;

S5: Repeating the above step S4 until a whole surface adjustment is completed, so that the forming module forms a complete mold surface;

S6: Removing the external shape-adjusting component from a top of the mold box, and installing the mold box with forming module on a forming equipment;

S7: Putting in a sheet metal workpiece for processing, and putting down the forming equipment;

S8: After the sheet metal processing is completed, lifting the forming equipment and taking out the sheet metal workpiece.

Furthermore, in step S7, after the sheet metal workpiece for processing is put in and the forming equipment is put down, starting an external heat source, so that a heating rod set inside the basic unit body is energized to heat.

Compared with the traditional technique, the present invention possesses the following beneficial effects:

1. The external, numerically controlled, rapid reconfigurable surface mold of the present invention adopts an external shape-adjusting component, and the motor used for shape adjustment is placed outside the mold box. Compared with the built-in motor that occupies a large amount of shape adjustment space inside the mold box. According to the invention, the shape adjustment space inside the box body of the mold is larger, and the space occupied by the built-in motor of the traditional equipment is also equivalently converted into the shape adjustment operation space of the mold, and the curvature range of the curved surface parts processed by the equipment is expanded accordingly.

2. The external, numerically controlled, rapid reconfigurable surface mold in the present invention will place an external shape-adjusting component, so that the overall weight of the mold box is greatly reduced, and the externalization of the motor greatly reduces the difficulty of maintaining and repairing the motor.

3. The external, numerically controlled, rapid reconfigurable surface mold in the present invention has the shape external shape-adjusting component externally located and the whole forming process adopts the external shape adjustment method to adjust the shape. Since the motor used for shape adjustment is moved out, the inside of the mold box is more abundant for the shape adjustment operation space of the forming module. Therefore, the difficulty of reassembly of the basic unit in the forming module to meet the forming requirements is greatly reduced, the basic body units in the forming unit can be combined in more ways, the forming processing range is also wider. Moreover, it can process sheet metal as well as composite materials.

4. The external, numerically controlled, rapid reconfigurable surface mold in the invention adopts an external shape-adjusting component. On the one hand, the motor used for shape adjustment is placed outside the mold box to keep a certain distance from the mold box; on the other hand, the internal space of the mold box is released, and the heating rod is set inside the basic body unit of the forming module to achieve one-to-one in-situ heating of the basic body unit. When processing composite sheet, in the heating process, there is no need to place the mold in the oven to heat, which avoids during the heating process, the built-in motor in the traditional forming equipment the loss of magnetism, misalignment and damage. In this way, the stability of the equipment is better and the processing and forming accuracy is also higher.

Figure 1:
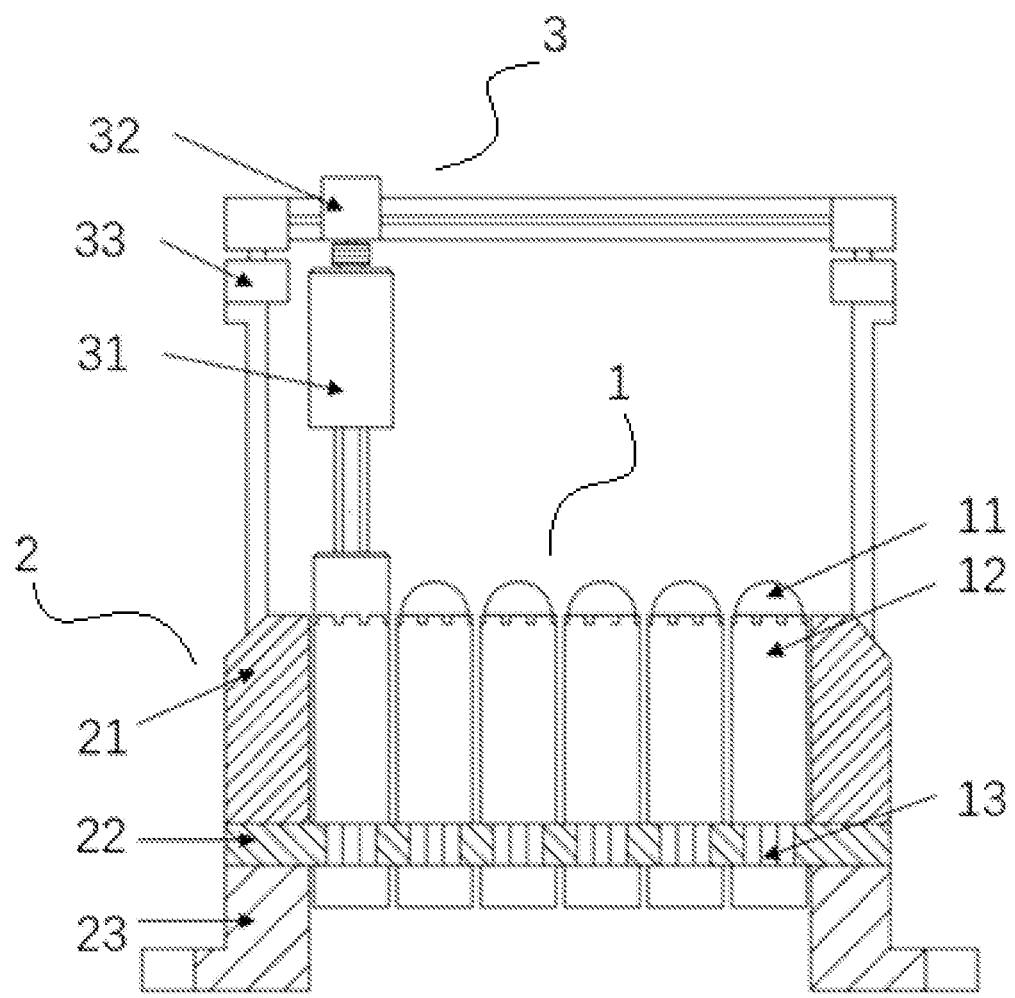
FIG. 1 is the structure diagram of the external, numerically controlled, rapid reconfigurable surface mold in the invention.

In the drawings: 1—forming module, 2—mold box, 3—the external shape-adjusting component; 11—punch, 12—height-regulating unit in Z-direction, 131'fixed screw, 14—heating rod; 21—sealing plate, 22—bottom plate, 23—base; 31—height-regulating rod, 32—motor, 33—sliding guide rail module, 311—upper height-regulating rod, 312—elastic connecting unit, 313—lower height-regulating rod.

DESCRIPTION OF THE EMBODIMENTS

Embodiment 1: (an External, Numerically Controlled, Rapid Reconfigurable Surface Mold)

The present embodiment 1 discloses an external, numerically controlled, rapid reconfigurable surface mold , as shown in FIG. 1, the forming mold includes: forming module 1, mold box 2 and the external shape external shape-adjusting component 3; More specifically, the forming module 1 is arranged in the mold box 2, the external shape-adjusting component 3 is arranged on the outside of the mold box 2 above and is directly facing the forming module 1.

The structure and connection relationship of each component of the forming mold is as follows:

As shown in FIG. 1, the forming module 1 is composed of several basic body units arranged in a matrix. The basic body unit is vertically arranged along the Z direction, including a punch 11, a height-regulating unit in Z-direction 12, and a fixed screw 13. More specifically, the punch 11 connects the top of the height-regulating unit in Z-direction 12, the height-regulating unit in Z-direction 12 has the hollow tubular body. It is easily found that around the top edge of the height-regulating unit in Z-direction 12 even opens a ring opening up similar to the shape of rectangle spline and the height-regulating unit in Z-direction 12 inside wall body has match the fixed screw 13 internal thread connection. The fixed screw 13 with the shaft sleeve is arranged in the inner side of the height-regulating unit in Z-direction 12, and is connected with the height-regulating unit in Z-direction 12 thread. When the fixed screw 13 is relatively fixed, by rotating the height-regulating unit in Z-direction 12 to adjust its linear motion along the axis. The lower end of the fixed screw 13 is provided with a fixed connection with the bottom plate 22 of the mold box 2. A matrix arrangement of the basic body unit is fixedly installed on the bottom plate 22 of the mold box 2 through the fixed connecting part. The degree of freedom is 0. In the shape adjustment process, the fixed screw 13 mainly plays an axial support role.

Figure 5:
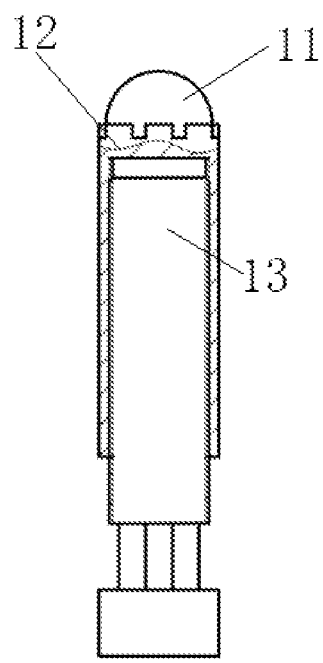
FIG. 5 is the structure diagram of the first basic body unit structure in the mold of the invention.

In embodiment 1, the basic body unit has a variety of structural designs, wherein:

As shown in FIG. 5, the basic unit of the first kind of structure is: the punch 11 at the top of the height-regulating unit in Z-direction 12 is a stationary punch and the punch 11 fixed installation on the top of the height-regulating unit in Z-direction 12. In the present embodiment 1, the top punching surface of the fixed punch is spherical, and the fixed punch is suitable for the processing of thick plate parts where indentation and pits are not easy to appear. The fixed screw 13 is a solid column structure. The basic unit of the first structure design is suitable for cold forming thick sheet metal.

Figure 6:
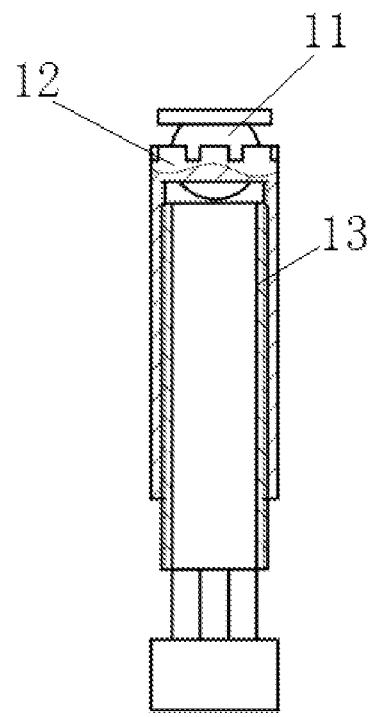
FIG. 6 is a structure diagram of the structure of the second basic body unit in the mold of the invention.

As shown in FIG. 6, the second structure of the basic volume unit is: the punch 11 which is located at the top of the height-regulating unit in Z-direction 12 is an oscillating punch. The punch 11 is stated within the scope of a certain angular swing link (hinge) on the top of the height-regulating unit in Z-direction 12. In the implementation of the mold box 2, the top punching surface of the swing punch is flat, and the swing punch is suitable for processing parts such as thin plates or composite materials that are easy to extrude pits and indentations. The fixed screw 13 has a hollow barrel structure. The basic body unit of the second structural design is suitable for cold forming thick sheet metal.

Figure 7:
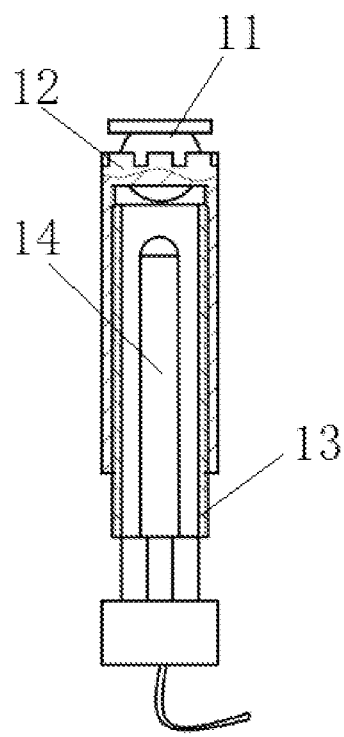
FIG. 7 is the structure diagram of the third basic body unit structure in the mold of the invention.

As shown in FIG. 7, the third structure of the basic body unit is as follows: the punch 11 at the top of the height-regulating unit in Z-direction 12 is a swing punch. The punch 11 is oscillatingly connected (hinged) at the top of the height-regulating unit in Z-direction 12 within a certain swing angle range. In the third embodiment, the stamping surface at the top of the swing punch is flat. The fixed screw 13 has hollow tube structure, and the hollow fixed screw 13 is provided with a heating rod 14 and the heating rod 14 is electric heating type heating rod. Heating rod 14 is electrically connected with the external power supply of the basic body unit to achieve energized heating; The third basic body unit of structural design is suitable for hot-pressing composite sheet.

Based on the basic body unit structure design, the free selection and combination of each component structure makes the processing range of the forming module composed of the basic unit more extensive.

As shown in FIG. 1, the mold box 2 comprises a sealing plate 21, a bottom plate 22 and a base 23; Among them, the bottom plate 22 are rectangular plates. The sealing plate 21 is erected vertically and fixedly installed around the top of the bottom plate 22 and the relatively independent module is used to set installation forming closed space. The bottom plate 22 is provided with mounting holes corresponding to the basic body units constituting the forming module one-to-one and working for the basic unit of fixed screw 13 on the bottom plate 22 matching installation. The base 23 is fixedly installed at the bottom four corners of the bottom plate 22 to provide reliable support for the mold box 2 and even the whole equipment.

As shown in FIG. 1, the external shape-adjusting component 3 comprises a height-regulating rod 31, a motor 32, and a sliding guide rail module 33. Wherein, the sliding guide rail module 33 is detachably installed above the mold box 2. In the present embodiment 1, the bottom of the sliding guide rail module 33 around is installed on the sealing plate 21 of the mold box 2. The sliding rail of sliding guide rail module 33 is located directly above the forming module in mold box 2. Motor 32 is sliding connected to the sliding guide rail module 33, and sliding along the sliding rail in the horizontal direction of a straight line. The height-regulating rod 31 is vertically connected under the motor 32. After driven by the motor 32, the sliding guide rail module 33 is linearly sliding in the horizontal direction.

Figure 2:
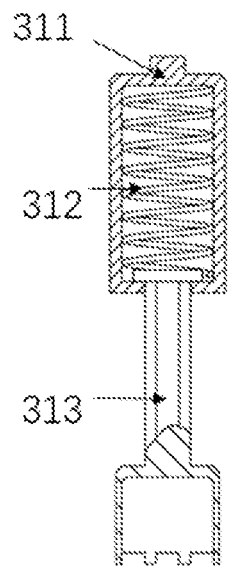
FIG. 2 is the structure diagram of the height-regulating rod of the external shape-adjusting component in the mold of the invention.
Figure 3:
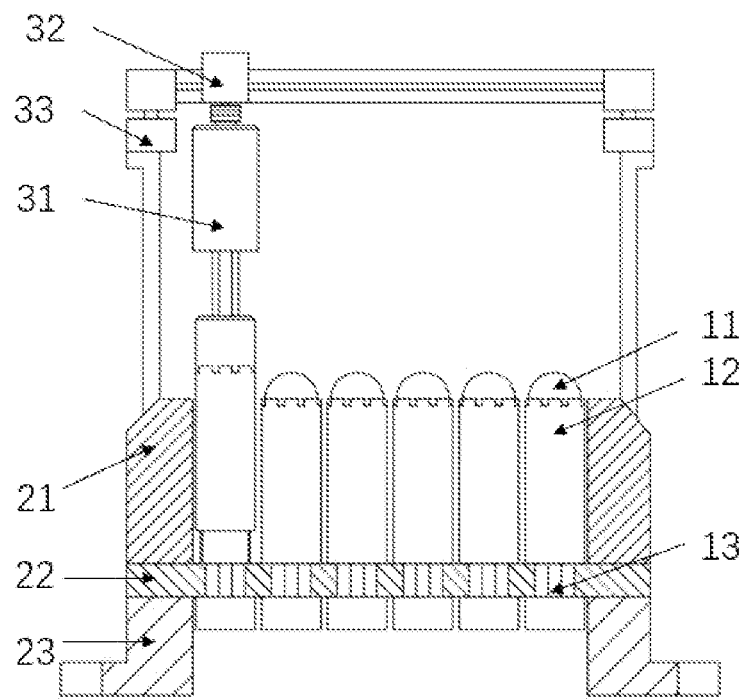
FIG. 3 is a structure diagram of a basic body unit adjusted by the external shape-adjusting component in the mold of the invention.
Figure 4:
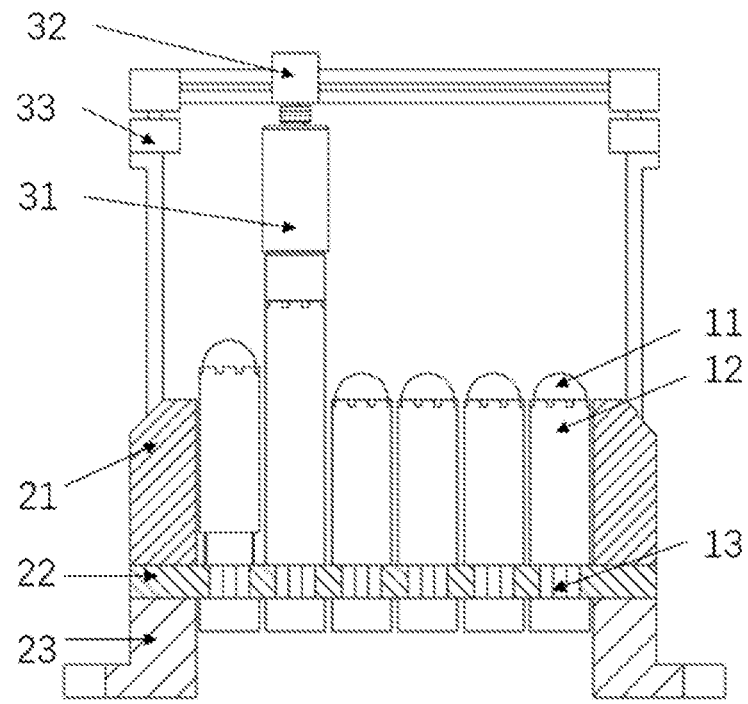
FIG. 4 is a structure diagram of another basic body unit adjusted by the external shape-adjusting component in the mold of the invention.

As shown in FIG. 2, the height-regulating rod 31 consists of an upper height-regulating rod 311, an elastic connecting unit 312, and a lower height-regulating rod 313. Wherein, the upper end of the upper height-regulating rod 311 has hollow structure and is provided with a motor connecting part connected with the output end of motor 32 through a coupling. The lower part of the upper height-regulating rod 311 is open. The upper part of the lower height-regulating rod 313 is placed in the upper height-regulating rod 311 cavity, and can slide along the upper height-regulating rod 311 axial. The upper part of the lower height-regulating rod 313 is provided with an outer edge of interference with the bottom opening of the upper height-regulating rod 311 to achieve the limit of the stroke end point. A key connection structure is arranged between the upper height-regulating rod 311 and lower height-regulating rod 313 to realize the power transfer in the circumferential direction. The elastic connecting unit 312 is placed in the upper height-regulating rod 311 cavity. One end of the elastic connecting unit 312 is top on the upper inner side of the upper height-regulating rod 311 and the other end is top on the upper outer side of the lower height-regulating rod 313. In the free state without external force, in the elastic connecting unit 312 elastic pre-tightening, lower height-regulating rod 313 is top pressure on the lower end of the upper height-regulating rod 311 and under the action of the axial external force, the lower height-regulating rod 313 overcomes the elastic force of the elastic connecting unit 312 along the axial movement. Once the external force decreases or disappears, the lower height-regulating rod 313 will be pushed back to the lower end of the upper height-regulating rod 311 again under the elastic action of the elastic connecting unit 312, so as to achieve the elastic expansion between the upper height-regulating rod 311 and the lower height-regulating rod 313;

In the present embodiment 1, the elastic connecting unit 312 adopts spiral spring. Rubber and other elastic elements can also be used;

The lower end of the lower height-regulating rod 313 has a connection cap, the connection cap informing the top of the module of the basic body unit, connect the bottom of the cap edge even open a downward opening is similar to the shape of rectangle spline, the rectangular tooth groove at the bottom edge of the connecting cap meshes with the rectangular tooth groove at the top edge of the height-regulating unit in Z-direction 12 to achieve circumferential direction limit;

As shown in FIG. 3 and FIG. 4, when the height-regulating rod 31 moves directly above a basic body unit driven by motor 32, the lower height-regulating rod 313 of height-regulating rod 31 and the height-regulating unit in Z-direction 12 of the basic body unit realize circumferential limit through rectangular teeth. Driven by motor 32, The lower height-regulating rod 313 drives the height-regulating unit in Z-direction 12 to rotate, and then adjusts the height-regulating unit in Z-direction 12 to rise and fall along the axial direction, and finally realizes the z-direction height adjustment of punch 11. In the adjustment process, the lower height-regulating rod 313 overcomes the elasticity of the elastic connecting unit 312 and moves up and down in the cavity of the upper height-regulating rod 311.

Embodiment 2: (the Forming Method Thereof for Processing Thick Plate of an External, Numerically Controlled, Rapid Reconfigurable Surface Mold)

The present embodiment 2 discloses an external, numerically controlled, rapid reconfigurable surface mold and its forming method thereof, and the forming method is realized by using an external, numerically controlled, rapid reconfigurable surface mold described in the above embodiment.

The forming method described in embodiment 2 is used to process thick plate workpiece, and the specific process is as follows:

A1: Assemble the forming module, connect the fixed punch 11, height-regulating unit in Z-direction 12, and solid structure fixed screw 13 into the basic body unit and fix it on the bottom plate 22, to ensure that all the basic body units of the forming module 1 are in the initial state of height 0;

A2: The external shape-adjusting component 3 is installed above the mold box 2, and the height-regulating rod 31 moves along with the sliding guide rail module 33 with the motor 32 to the initial coordinate (0,0) of the shape adjusting surface in the horizontal direction. The lower height-regulating rod 313 of the height-regulating rod 31 is placed on the fixed punch 11. And through the rectangular tooth and the height-regulating unit in Z-direction 12 along with the circumferential direction limit connection, turn off the motor and complete the shape adjustment of the corresponding basic body unit under the initial coordinates;

A3: Start motor 32, lower height-regulating rod 313 under the drive of motor 32, drive the rotation of height-regulating unit in Z-direction 12, realize the height-regulating unit in Z-direction 12 along the axial rise and fall, then adjust the Z-direction height of punch 11, turn off the motor 32, complete the shape adjustment work of the corresponding basic body unit under the initial coordinates;

A4: The height-regulating rod 31 moves along the motor 32 to the next coordinate of the shape surface to be adjusted in the horizontal direction along with the sliding guide rail module 33. Repeat the above step A3 to complete the shape-adjusting work of the corresponding basic body unit in the corresponding coordinates.

A5: Repeat the above step A4 until the whole surface adjustment is completed, so that the forming module 1 forms a complete die surface, and according to the actual needs, complete the forming of the upper and lower die corresponding multi-point forming equipment adjustment work respectively;

A6: Remove the external shape adjusting mechanism 3 of the multi-point forming equipment corresponding to the upper and lower molds respectively, and install the mold box 2 with forming module 1 on the forming equipment respectively;

A7: Put in the thick plate for processing, and lower the forming equipment;

A8: After the thick plate is processed, raise the forming equipment and take out the thick plate workpiece.

Embodiment 3: (the Forming Method Thereof for Processing Composite of an External, Numerically Controlled, Rapid Reconfigurable Surface Mold)

The present embodiment 3 discloses an external, numerically controlled, rapid reconfigurable surface mold and its forming method thereof The forming method is realized by using an externally modulated form of numerically controlled, rapid reconfigurable surface mold of the above embodiment.

The forming method described in the embodiment 3 is used to process the composite sheet workpiece, and the specific process is as follows:

B1: Assemble the forming module, connect the fixed punch 11, the height-regulating unit in Z-direction 12 and solid structure fixed screw 13 together into a basic body unit and fix it on the bottom plate 22 to ensure that all the basic body units of the forming module 1 are in the initial state of height 0;

B2: the external shape-adjusting component 3 is installed above the mold box 2, and the control height-regulating rod 31 moves along the sliding guide rail module 33 with the motor 32 to the initial coordinate (0,0) of the profile adjusting surface in the horizontal direction. The connection cap of the lower height-regulating rod 313 is placed on the fixed punch 11. And through the rectangular tooth and the height-regulating unit in Z-direction 12 along the circumferential direction limit connection;

B3: Start motor 32, lower height-regulating rod 313, driven by motor 32, drives the height-regulating unit in Z-direction 12 to rotate, realizes the axial lifting of height-regulating unit in Z-direction 12, then adjusts the Z-direction height of punch 11, closes the motor 32, and completes the shape adjustment of the corresponding basic body unit under the initial coordinates;

B4: The control height-regulating rod 31 moves along the motor 32 along the sliding guide rail module 33 to the next coordinate of the surface to be adjusted in the horizontal direction. Repeat step B3 above to complete the adjusting work of the corresponding basic body unit in the corresponding coordinates.

B5: repeat the above steps B4 until the whole surface adjustment is completed, so that the forming module 1 forms a complete mold surface, and according to the actual needs, complete the forming of upper and lower die corresponding multi-point forming equipment adjustment work respectively;

B6: Remove the external shape adjusting mechanism 3 of the multi-point forming equipment corresponding to the upper and lower molds respectively, and install the mold box 2 with forming module 1 on the forming equipment respectively;

B7: Lay the indentation inhibiting pad and composite material plate, lower the forming equipment, start the external heating power supply, and start heating the heating rod 14 in the height-regulating unit in Z-direction 12.

B8: After the composite plate is processed, raise the forming equipment and take out the composite plate workpiece.

What is claimed is:

1. An external, rapidly reconfigurable surface mold, comprising: a forming module, a mold box, and a shape-adjusting component, wherein,
   the shape-adjusting component is an external adjusting component installed above the forming module, and comprises a height-regulating rod, a motor, and a sliding guide rail module, the height-regulating rod is connected to the sliding guide rail module, an output end of the motor is coaxially connected with an upper end of the height-regulating rod so that the motor is configured to drive the height-regulating rod;
   the forming module comprises a plurality of basic body units with a same structure, a lower end of each of the plurality of basic body units is installed in the mold box, an upper end of each of the plurality of basic body units is matched with a lower end of the height-regulating rod, and a height between the upper end of each of the plurality of basic body units and the lower end of each of the plurality of basic body units is adjustable;
   the height-regulating rod is configured to move to a position above any of the plurality of basic body units and the lower end of the height-regulating rod and the upper end of any of the plurality of basic body units can be matched and connected, and the lower end of the height-regulating rod is slidable so that the height between the upper end of any of the plurality of basic body units and the lower end of any of the plurality of basic body units is-is configured to be adjusted,
   wherein the height-regulating rod is configured to move along the sliding guide rail module to an initial coordinate position of a shape surface to be adjusted in a horizontal direction, allowing the height-regulating rod to connect with the upper end of one of the plurality of basic body units,
   wherein the surface mold is configured to perform a shape-adjusting work on the connected basic body unit of the plurality of basic body units under the initial coordinate position upon adjustment of the height between the upper end and the lower end of the connected basic body unit of the plurality of basic body units, and
   wherein the height-regulating rod is configured to move along the sliding guide rail module to a next coordinate position of the shape surface to be adjusted in the horizontal direction, allowing the height-regulating rod to connect with the upper end of another of the plurality of basic body units, and the forming module is thereby configured to form a complete mold surface.

2. The external, rapidly reconfigurable surface mold according to claim 1, wherein,
   each of the plurality of basic body units comprises a punch, a height-regulating unit in a Z-direction, and a fixed screw;
   the punch is arranged on a top of the height-regulating unit in the Z-direction, and
   the height-regulating unit in the Z-direction is coaxially threaded with the fixed screw.

3. The external, rapidly reconfigurable surface mold according to claim 2, wherein,
   the punch is a fixed punch or a swing punch; and
   the fixed screw is a solid or a hollow structure.

4. The external, rapidly reconfigurable surface mold according to claim 3, wherein, the fixed screw is a hollow structure, and a heating rod is arranged inside.

5. The external, rapidly reconfigurable surface mold according to claims 2, wherein,
   the height-regulating rod comprises an upper height-regulating rod, an elastic connecting unit, and a lower height-regulating rod;
   an upper end of the upper height-regulating rod is coaxially rotatably connected with the motor, the lower height-regulating rod is coaxially rotatably connected with a lower end of the upper height-regulating rod, and the lower height-regulating rod is axially slidably connected with the upper height-regulating rod;
   the elastic connecting unit is arranged axially between the upper height-regulating rod and the lower height-regulating rod;
   the lower end of the lower height-regulating rod is provided with a connecting cover, and
   the connecting cover is arranged on an outside of the punch and is matched and connected with the top of the height-regulating unit in the Z-direction to realize synchronous rotation.

6. The external, rapidly reconfigurable surface mold according to claim 5, wherein,
   the connecting cover at the lower end of the lower height-regulating rod is matched with the top of the height-regulating unit in the Z-direction by a rectangular groove.

7. The external, rapidly reconfigurable surface mold according to claim 5, wherein,
   the elastic connecting unit is a spring or a rubber.

8. The external, rapidly reconfigurable surface mold according to claim 1, wherein,
   the mold box comprises a sealing plate, a bottom plate, and a base;
   the sealing plate is fixed around a top of the bottom plate, and the base is fixed at a bottom of the bottom plate;
   the sliding guide rail module is fixedly installed on the sealing plate; and
   the lower end of each of the plurality of basic body units is fixed to the bottom plate.

9. A method for forming an external, rapidly reconfigurable surface mold comprising:
   S1: assembling a forming module comprising a plurality of basic body units in a mold box to ensure that each of the plurality basic body is in an initial state;
   S2: installing an external shape-adjusting component above the mold box, and controlling a height-regulating rod of the external shape-adjusting component to move along a sliding guide rail module of the external shape-adjusting component to an initial coordinate position of a shape surface to be adjusted in a horizontal direction, and the height-regulating rod is connected with the upper end of one of the plurality of basic body units;
   S3: starting a motor to drive the height-regulating rod to move, after controlling and adjusting the height of an upper end of connected basic body unit of the plurality of basic body units relative to the lower end of the connected basic body unit of the plurality of basic body units, turning off the motor and completing a shape-adjusting work of the connected basic body unit of the plurality of basic body units under the initial coordinate position;

S4: controlling the height-regulating rod to move along the sliding guide rail module to a next coordinate position of the shape surface to be adjusted in the horizontal direction, repeating the above step S3 at the next coordinate position to complete the shape-adjusting work of one of the plurality of basic body units at the next coordinate position;

S5: repeating the above step S4 until a whole surface adjustment is completed, so that the forming module forms a complete mold surface;

S6: removing the external shape-adjusting component from a top of the mold box, and installing the mold box with forming module on a forming equipment;

S7: putting in a sheet metal workpiece for processing, and putting down the forming equipment;

S8: after the sheet metal processing is completed, lifting the forming equipment and taking out the sheet metal workpiece.

10. The method for forming the external, rapidly reconfigurable surface mold according to claim 9, wherein, in step S7, after the sheet metal workpiece for processing is put in and the forming equipment is put down, starting an external heat source, so that a heating rod set inside one of the plurality of basic body units is energized to heat.

* * * * *